United States Patent [19]

Gillespie

[11] 4,335,591
[45] Jun. 22, 1982

[54] MULTIPLE WASHER LAUNDRY SYSTEM WITH COMMON FUNCTION CONTROL

[75] Inventor: Robert A. Gillespie, Bridgeport, Conn.

[73] Assignee: Brent Chemicals Corporation, Stamford, Conn.

[21] Appl. No.: 161,754

[22] Filed: Jun. 23, 1980

[51] Int. Cl.³ .................... D06F 31/00; D06F 33/02
[52] U.S. Cl. ......................................... 68/12 R; 68/27
[58] Field of Search .................. 68/12 R, 27; 364/101; 134/57 R, 57 D

[56] References Cited

U.S. PATENT DOCUMENTS

| | | | |
|---|---|---|---|
| 3,774,056 | 11/1973 | Sample et al. | 68/12 R X |
| 3,840,752 | 10/1974 | Eshraghian | 307/141 |
| 3,896,827 | 7/1975 | Robinson | 134/10 |
| 3,922,889 | 12/1975 | Karklys | 68/12 R |
| 3,937,981 | 2/1976 | Nystuen et al. | 134/58 R X |
| 3,961,231 | 6/1976 | Gillespie | 222/70 X |
| 4,001,599 | 1/1977 | Karklys | 68/12 R X |
| 4,035,795 | 7/1977 | Fosnough et al. | 340/365 C |
| 4,068,179 | 1/1978 | Sample et al. | 134/57 D X |
| 4,084,237 | 4/1978 | Beachem et al. | 68/12 R X |

*Primary Examiner*—Philip R. Coe
*Attorney, Agent, or Firm*—Curtis Ailes

[57] ABSTRACT

A separate sequence controller is connected to each washer within a multiple washer laundry system for controlling the sequential operations of that washer. Each of the controllers has an intercommunication channel to every other one of the controllers. The controllers are operable to intercommunicate by signals through those channels to operate together on the basis of those signals to permit only one washer at a time to perform a common function that is to be performed by only one washer at a time.

20 Claims, 6 Drawing Figures

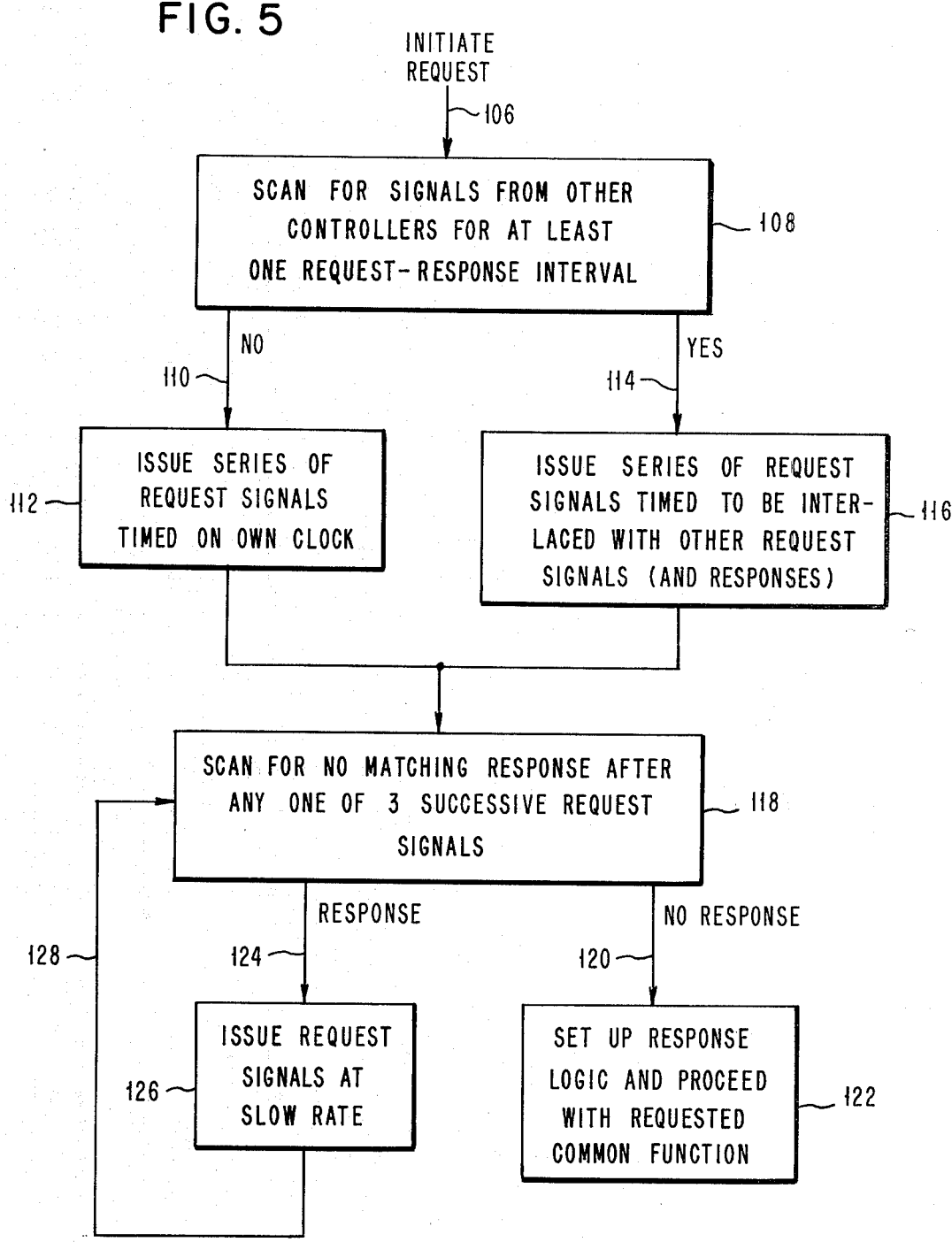

MULTIPLE WASHER LAUNDRY SYSTEM WITH COMMON FUNCTION CONTROL

BACKGROUND OF THE INVENTION

1. Field of the Invention

The invention relates to control and operating systems for large commercial or institutional laundry installations generally employing three or more washing machines. In such installations, it is common to have a fairly large number of different chemicals which can be injected into each machine, such chemicals including different types of detergent, bleaches, and souring agents, and the like. For purposes of economy and efficiency, and to make each washer as versatile as possible, it is preferred to provide that each chemical can be injected into every washer. It is also preferred that single reservoirs be provided for each chemical for the entire laundry, and that a single pump be provided for the delivery of each chemical, the pump generally being capable of delivering that chemical only to one washer at a time. This creates a problem if a particular chemical is demanded by more than one washer at a time. There are other common functions which should be performed by only one washer at a time, in addition to the injection of individual chemicals. For instance, it is very desirable that a high speed spin operation (for extraction) be performed by only one washer at a time so as to keep the peak electrical load demand for the laundry as low as possible.

Accordingly, it is an important object of the invention to provide an improved control system for a multiple washer laundry which is capable of assuring that only one washer at a time performs a common function which is to be performed by only one washer at a time.

2. Description of Prior Art

One very useful approach to the above problem is disclosed in U.S. Pat. No. 3,961,231 issued June 1, 1976 for a "Controlled Chemical Injection System for Washing Machines" invented by the same inventor as the present invention and assigned to the same assignee as the present invention. The system of that patent requires a separate relay interlock system interlinking all of the washing machines for every separate chemical supply system, with separate blocking relay contacts operable by each washer to block out every other washer when that washer is using the common chemical supply system. That system is very useful and has been found to be very satisfactory, except that the number of contact points required by each washer to block every other washer for every common function which is to be performed by only one washer at a time becomes excessive in a larger system, and the amount of wiring required between the controllers for the different washers becomes excessive and complicated.

Accordingly, it is another objective of the present invention to overcome the disadvantages of prior systems of the nature described above, and to provide an improved control and operating system for a laundry which permits only one washer at a time to perform a common function that must be performed by only one washer at a time.

SUMMARY OF THE INVENTION

In carrying out the invention there is provided a control and operating system for a laundry having a plurality of washers and having at least one function which is common to more than one of said washers that is to be performed by only one washer at a time, comprising a separate sequence controller connected to each washer for controlling the sequential operations of that washer, each of said controllers having an intercommunication channel to every other one of said controllers, said controllers being operable to intercommunicate by signals through said channels and to operate concurrently on the basis of those signals to permit only one washer at a time to perform a common function that is to be performed by only one washer at a time.

BRIEF DESCRIPTION OF THE DRAWINGS

FIG. 5 is a logic flow chart illustrating the operation of the intercommunication logic portions of the sequence controllers of FIG. 1 in carrying out the intercommunication between controllers.

DETAILED DESCRIPTION OF PREFERRED EMBODIMENT

Figure 1:
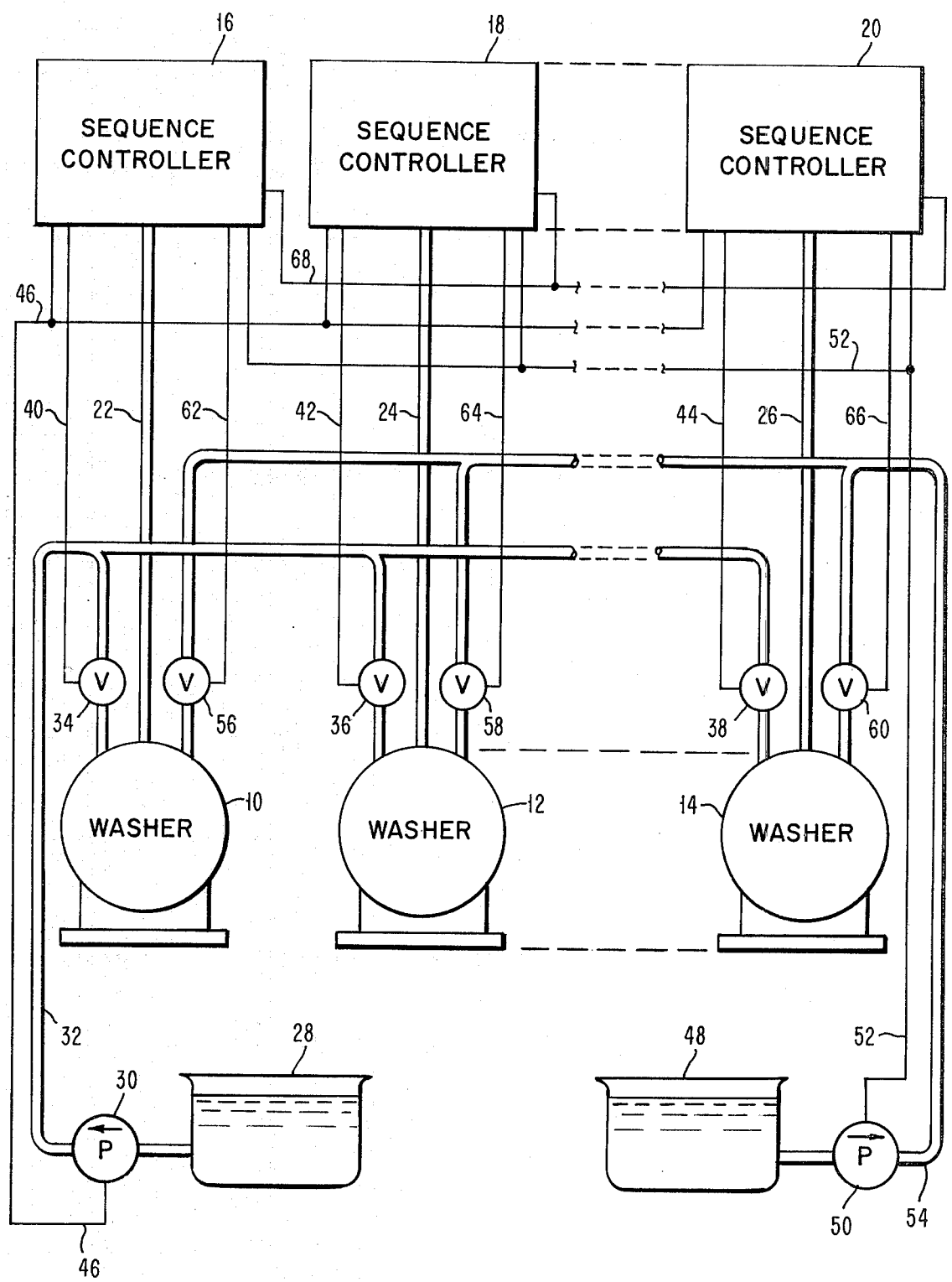
FIG. 1 is a schematic representation of a preferred form of the system of the invention.

Referring more particularly to FIG. 1, there is illustrated a control and operating system for a laundry which preferably includes a number of separate washers 10, 12, and 14. As indicated by the dotted lines between washer 12 and washer 14, it is contemplated that there may be many more than the three washers illustrated, but only three are illustrated in order to simplify the drawings. The individual washers are of the type which are used in commercial laundries, and are sometimes referred to as wash wheels, since they frequently are in the form of large perforated drums rotatable about a horizontal axis within tub enclosures. Each washer has appropriate fill and drain valves which are not illustrated in detail in the drawings.

Connected to each of the respective washers there are sequence controllers 16, 18, and 20 which are operable through connections contained in control cables respectively indicated at 22, 24, and 26 to control the sequence of operations of the washers 10, 12, and 14 respectively. The sequence controllers 16, 18, 20 are preferably in the form of microcomputer control systems which are programmable to provide various different desired washer programs (sometimes referred to in the industry as different washing "formulas"). Thus, there are washing sequences for lightly soiled clothing or bedclothes, and other sequences for heavily soiled clothing, or clothing having particular kinds of soil requiring special chemicals and detergents.

For maximum economy and convenience, common reservoirs and delivery systems for the various chemicals, such as detergents, and bleaches, and the like are provided to serve all of the washers in the laundry. One of the common supply reservoirs is indicated at 28, which is the reservoir for a detergent. Connected to reservoir 28 there is a common delivery pump 30 for delivering the detergent through a pipe 32 to all of the various washers. From the pipe 32, the detergent is admitted to the individual washers through individual solenoid operated control valves 34, 36, and 38. The control valves 34, 36, and 38 are respectively controlled through electrical connections 40, 42, and 44 from the associated sequence controllers 16, 18, and 20. Also, each sequence controller is connected to energize a common circuit 46 for energizing the detergent pump 30.

A common bleach reservoir is shown at 48. A system for delivery of the bleach is provided which is virtually identical to that described for the detergent, including a common pump 50 having a common energizing circuit 52 connected to receive energizing signals from all of the sequence controllers 16, 18, and 20. The pump 50 delivers bleach through pipe 54, and through the individually controlled electromagnetic valves 56, 58, and 60 to the individual washers 10, 12, and 14. Again, the valves 56, 58, and 60 are controlled from the individual sequence controllers 16, 18, and 20 through connections 62, 64, and 66. While only two chemicals and delivery systems are illustrated, it will be understood that many more may be provided for other chemicals.

The pumps 30 and 50 and the associated pipes 32 and 54 are designed to serve only one washer at a time. The delivery of each chemical is a function which is to be performed by only one washer at a time. In accordance with the present invention, each of the controllers 16, 18, and 20 has an intercommunication channel to every other one of the controllers, and each controller is operable to intercommunicate by signals through those channels. The controllers then operate together on the basis of those signals to permit only one washer at a time to perform a common function, such as the delivery of a particular chemical, which is to be performed by only one washer at a time. The communication channel from one controller to another is preferably carried out by a common wired interconnection 68, which is sometimes referred to below as an intercommunication bus. While schematically shown as a single wire, bus 68 preferably consists of a shielded two conductor cable.

While most of the common functions to be performed by only one washer at a time consist of the delivery of a chemical, it has been found to be very advantageous to limit the peak electrical system load in the laundry by assuring that only one washer wheel goes into a high speed spin cycle at a time. The high speed spin cycle, particularly during acceleration of the wheel, requires a high power drain. If more than one wheel is placed in the high speed spin cycle at a time, the peak power drain is greatly increased, and the laundry, which is generally billed partly according to peak power demand must pay a substantially higher power bill. Accordingly, another one of the functions which is common to more than one of the washers and which is to be performed by only one washer at a time is the high speed spin function. Still other functions, such as unloading the washer contents onto a common conveyor belt are preferably performed by only one washer at a time.

Briefly stated, the common function control by the intercommunication of the sequence controllers is accomplished in the following manner. When the control program of a particular controller such as controller 16, calls for the performance of a common function that is to be performed by only one washer at a time, such as the delivery of detergent from reservoir 28, controller 16 issues a request signal for the performance of that function on the intercommunication bus 68. If sequence controller 20 is, at that time, controlling its washer 14 for the delivery of detergent from reservoir 28, it is operable to respond to the request signal from controller 16 by sending out a response signal telling the requesting controller 16 to wait. The requesting controller then continues to issue requests and to receive wait responses until the controller 20 and washer 14 are finished with the delivery of detergent and it no longer sends out such response signals on the intercommunication bus. At that time, the sequence controller 16 takes possession of the detergent delivery system, sending out a pump energization signal on line 46 to energize pump 30 and sending out an energizing signal on connection 40 to its own detergent delivery valve 34 to provide for the delivery of detergent to its washer 10. At the same time, the sequence controller 16 stands ready to respond to any request from any other controller for the performance of the common function of receiving detergent by sending out a response signal to that other controller telling that other controller to wait.

The common functions are dealt with completely separately. Thus, washer 10 can be receiving detergent from detergent reservoir 28, washer 12 can be receiving bleach from the bleach reservoir 48, and washer 14 can be in a spin cycle, all at the same time, but the controller for each washer is maintaining exclusive control of that particular function while it is being performed, preventing any other washer from taking over that function which is to be performed by only one washer at a time.

Figure 2:
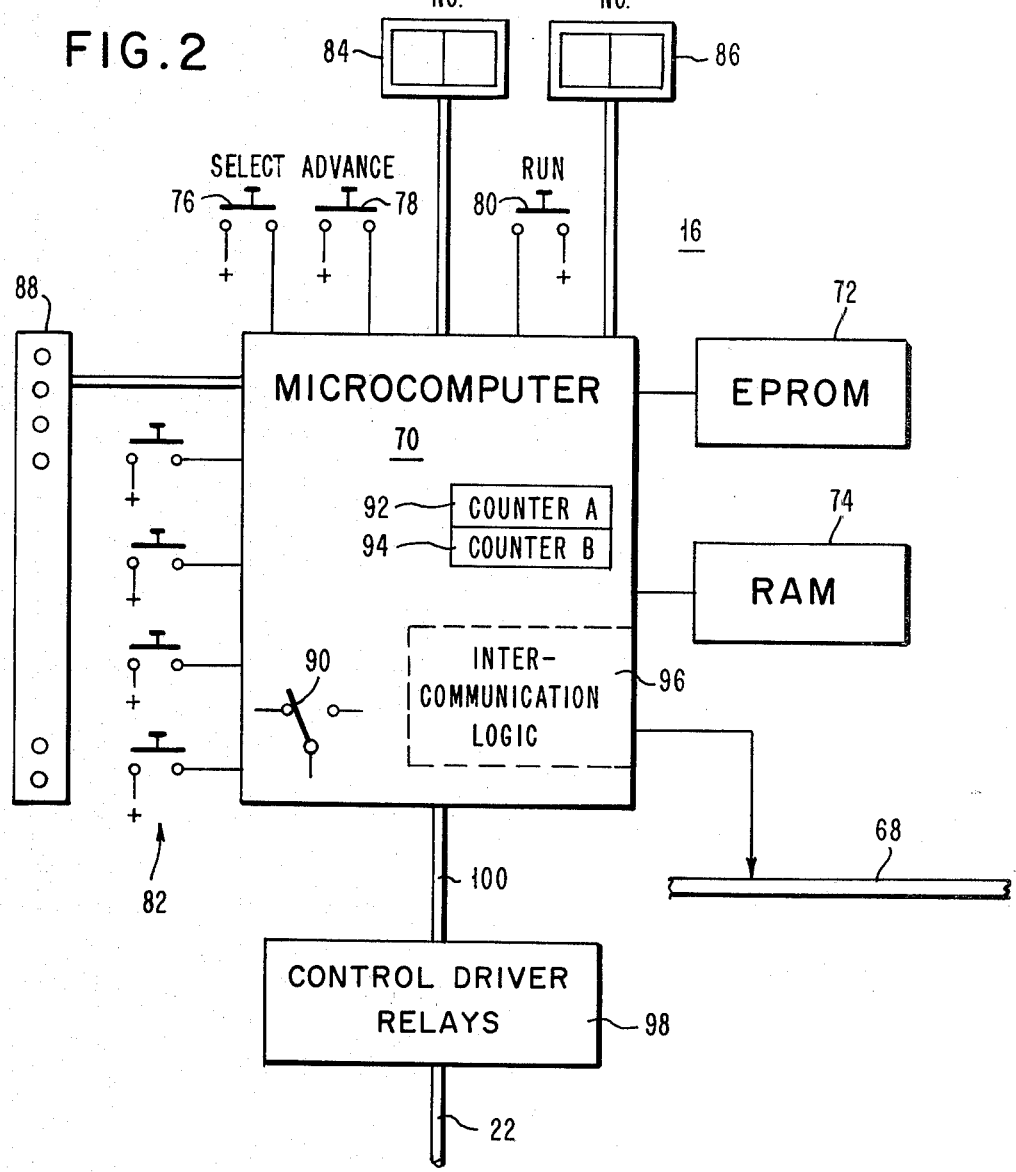
FIG. 2 is a more detailed schematic representation of a preferred form of a sequence controller employed in the system of FIG. 1.

FIG. 2 is a schematic representation showing more details of the sequence controller 16 of FIG. 1 as implemented in the form of a microcomputer. The controller may preferably be embodied by means of a single component microcomputer such as Intel Model 8035 available from Intel Corporation of Santa Clara, Calif. Such a microcomputer includes a clock, a central processor unit, a timer-event counter, a data memory, and twenty-seven input-output lines. In this particular model, an exterior program memory is used, and that function is provided by an EPROM 72, which is an erasable and electrically reprogrammable read-only memory. This function is preferably provided by an Intel Model 8755 EPROM unit. Various other peripheral logic elements may preferably be included as a part of the entire controller, including a random access memory 74, which may be composed of as many as eight Model 5101 CMOS RAM units, also available from Intel. The controller and microcomputer system may preferably include a number of other digital logic and storage and gating units, not separately identified in FIG. 2, including the following standard integrated circuits, identified by model number and in the following quantity:

| Quantity | Model No. | Function |
| --- | --- | --- |
| 8 | 2003A | Drivers for light-emitting diode displays |
| 1 | 4001 | Quad 2-input NOR gate |
| 1 | 4049 | Hex inverting buffer |
| 1 | 4556 | Dual one of four decoder |
| 1 | 4022B | Divide-by-eight counter with one of eight output |
| 1 | 4511 | Seven segment latch and driver (for display) |
| 4 | 4099 | 8-bit addressable latch |
| 1 | 4093 | Quad 2-input NAND Schmitt |

| Quantity | Model No. | Function |
|---|---|---|
| | | trigger |
| 4 | 4512 | 8-channel data selector |
| 1 | 4556 | Dual one of four decoder |
| 1 | 4011 | Quad 2-input NAND gate. |

It will be understood that the invention may also be implemented with other hardware, the above listing being illustrative only.

The sequence controller also preferably includes a series of manual control input signal buttons 76, 78, and 80, respectively labeled SELECT, ADVANCE, and RUN, by means of which the controller may be programmed and by means of which a particular program may be selected and caused to run. Additional manual input control buttons 82 are also provided, which can be programmed to provide various desired functions in terms of manual input signals to the controller.

The controller also preferably includes at least two 2-digit light-emitting diode decimal displays indicated at 84 and 86. The program which is being run is identified on display 86, and the step in the program which is being run is identified on display 84. An additional display 88 is preferably provided which consists of a series of small indicator lamps arranged in a vertical column and which may be labeled and which may be lighted in sequence as a new program is entered into the controller and also as the controller goes through a particular selected program. The illuminated lamp indicates the step being programmed or the step being run. The labels on the lamps may be functional step descriptions such as "LEVEL 1" (meaning "fill to level 1") and "CHEM 1" (meaning "add chemical 1").

The controller may also include an internal manually controllable switch 90 which can be operated only by opening an access door. Switch 90 is for placing the controller in a so-called "manual override mode". When in the manual override mode, the controller does not operate to add chemicals, but instead stops the program and sounds an alarm when a particular chemical is to be added, while at the same time flashing one of the lights in the panel 88 to indicate which chemical is to be added. The operation then adds the chemical manually and causes the controller to advance to the next step in the program by operating the advance switch 78. When switch 90 is switched back to the automatic mode, chemicals are added automatically, as programmed.

The controller also preferably includes two or more counter registers 92 and 94 which count the total number of times that each program is run by the controller and the washer, one counter being assigned to each different program that the controller is capable of performing. From time to time, the counts of total runs may be read from the counters 92 and 94, and the counters are then reset to "0". This provides a valuable means for measuring the amount of work done by the washer, the amount of water used by the washer, and the amount of the various chemicals used by the washer. It is also a useful management tool for measuring the productivity of the laundry.

The microcomputer system 70 of controller 16 includes intercommunication logic 96, by means of which the controller communicates with the other controllers through the intercommunication bus 68. The controller also preferably includes control driver relays 98 connected to the microcomputer through a multiple conductor cable 100, and through which the control signals are provided to the cable 22 which is connected to washer 10 as previously described in connection with FIG. 1.

While various signal formats can be used for the intercommunication from one controller to another, a preferred signal format which has been found to be very useful consists of a series of pulses for each request message and for each response message, five pulse intervals being provided for each message, and the duration of the pulse intervals being about two milliseconds. The pulses are emitted as short bursts of a 500 KHz carrier, a pulse signifying a binary digit 1, and the absence of a pulse signifying a binary digit 0.

Figure 3:
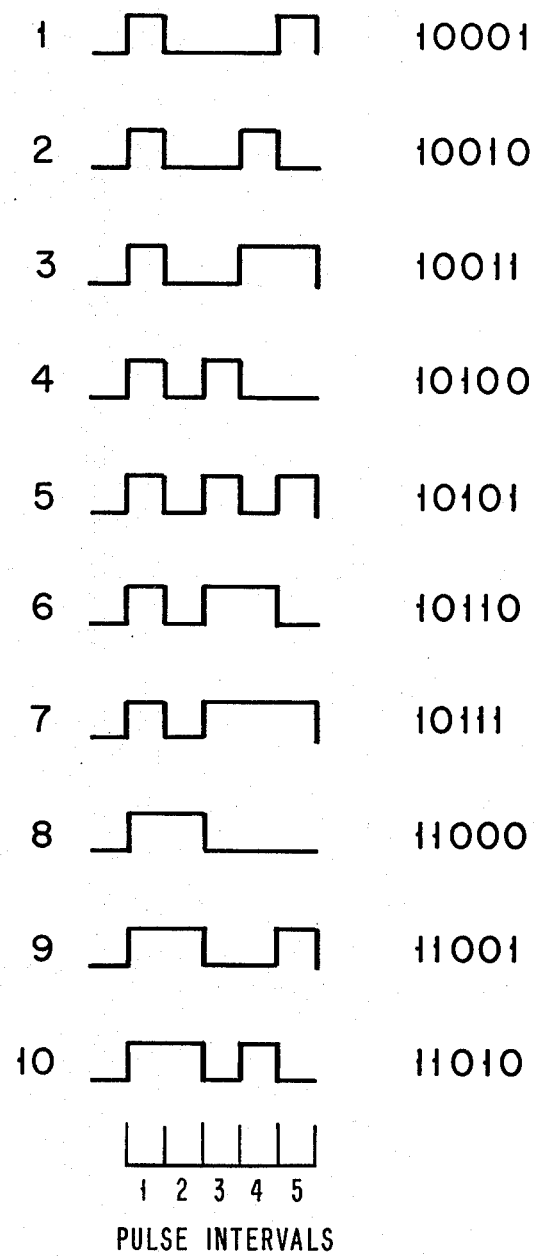
FIG. 3 consists of a series of signal pulse curves illustrating the pulse codes which are used for intercommunication between the sequence controllers of FIG. 1.

FIG. 3 illustrates the coding for ten different coded request signals for the performance of ten different common functions which may preferably be used in a practical system according to the present invention. Thus, ten different common functions which are to be performed by only one controller-washer combination at a time can be programmed. Each request begins with a "1" pulse which is only a pulse which signifies the beginning of a message, and has no other significance. Five pulse intervals are used, and the second, third, fourth and fifth pulse intervals are used to convey an identification of the function which is requested. It is to be seen from each line of the chart of FIG. 3 that the coding signified by the last four binary digits of each request is the binary equivalent of the decimal number of the function being requested. Thus, after the indexing pulse, the identification of request number one is "0001". Similarly, the request for function 6 is "0110".

Figure 4:
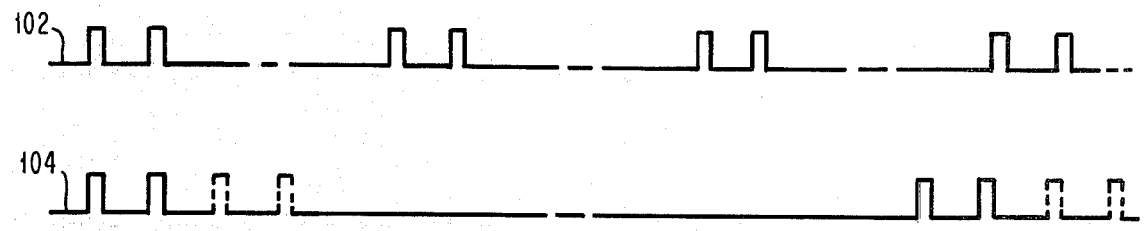
FIG. 4 presents two different typical pulse signal sequences showing how request and response signals are sent and received between the sequence controllers.

FIG. 4 illustrates at 102, in horizontally foreshortened form, the signal format in which a series of request signals are emitted to the intercommunication bus for the common function No. 1. The request signals are usually emitted in groups of about eight so that if there is any interference from request signals for another function, there is an opportunity for interlacing and for clear reception of the request signals by all of the controllers.

Whenever a response signal is to be emitted by a responding controller, it is emitted in the interval immediately succeeding each request code and preferably the response signal is in the form of exactly the same code as the request code so that it is easily identified by the requesting controller. In curve 104 of FIG. 4, there is illustrated a series of requests shown in full lines and a series of responses shown in dotted lines, and illustrating how the responses follow quickly after the requests, and are in the identical code, thus being in the nature of an "echo".

As indicated in curve 104, when responses are being received by the requesting controller, the rate of emission of requests is decreased while the requesting controller is waiting. This provides more time for other controllers to communicate with one another during the intervals between requests and responses. This greater interval between requests is signified in FIG. 4 by the presence of only two coded groups of request pulses and responses in curve 104.

FIG. 5 is a flow chart showing the preferred logical operation of the intercommunication logic 96 of FIG. 2 in carrying out the intercommunication function. As shown in FIG. 5, when a request for a particular common function which is to be performed by only one washer at a time is initiated, the initiation signal appears at 106. As indicated at 108, the controller then scans the intercommunication bus 68 for signals from other controllers for at least one request-response interval before doing anything else. If no such signals are detected, as indicated at 110, then, as shown at 112, the controller issues a series of request signals which are initiated by the controller's own clock. On the other hand, if request signals from other controllers are detected, as indicated at 114, then, as indicated at 116, the controller issues a series of request signals timed to be interlaced with request signals already appearing on the intercommunication bus from other controllers. Thus, the issuance of this series of request signals is timed by the timing of the existing request signals in order to accomplish the interlacing. This interlacing is provided in order to prevent a mixing of the different requests which might cause a receiving controller to misinterpret the information in each request.

No matter how the request signals are issued, as indicated at 118, the next logical operation is to scan the intercommunication bus 68 in the time interval immediately after each request signal for a matching response signal from another controller. If no responses are received for three successive request signals, as indicated at 120, then as indicated at 122, the controller proceeds with the sequence control step representing the common function and it also sets up the response circuit logic so that when any other controller requests this particular common function, a response signal will be returned to prevent that other controller from assuming this common function.

On the other hand, if the scanning for matching responses results in the receipt of a corresponding response signal, as indicated at 124, then additional request signals are emitted at regular intervals, but at a slower rate, as indicated at 126, and the logic operation is returned to box 118 as indicated at connection 128. The logic box 118 provides a no response output at connection 120 only after a series of successive request signals which have not been responded to (preferably three or more) in order to make sure that there is no ambiguity in the message that no other controller is performing this common function. The logic represented by the flow chart of FIG. 5 is carried out by the intercommunication logic 96 of FIG. 2 which is functionally illustrated in greater detail in the schematic logic circuit of FIG. 6.

Figure 6:
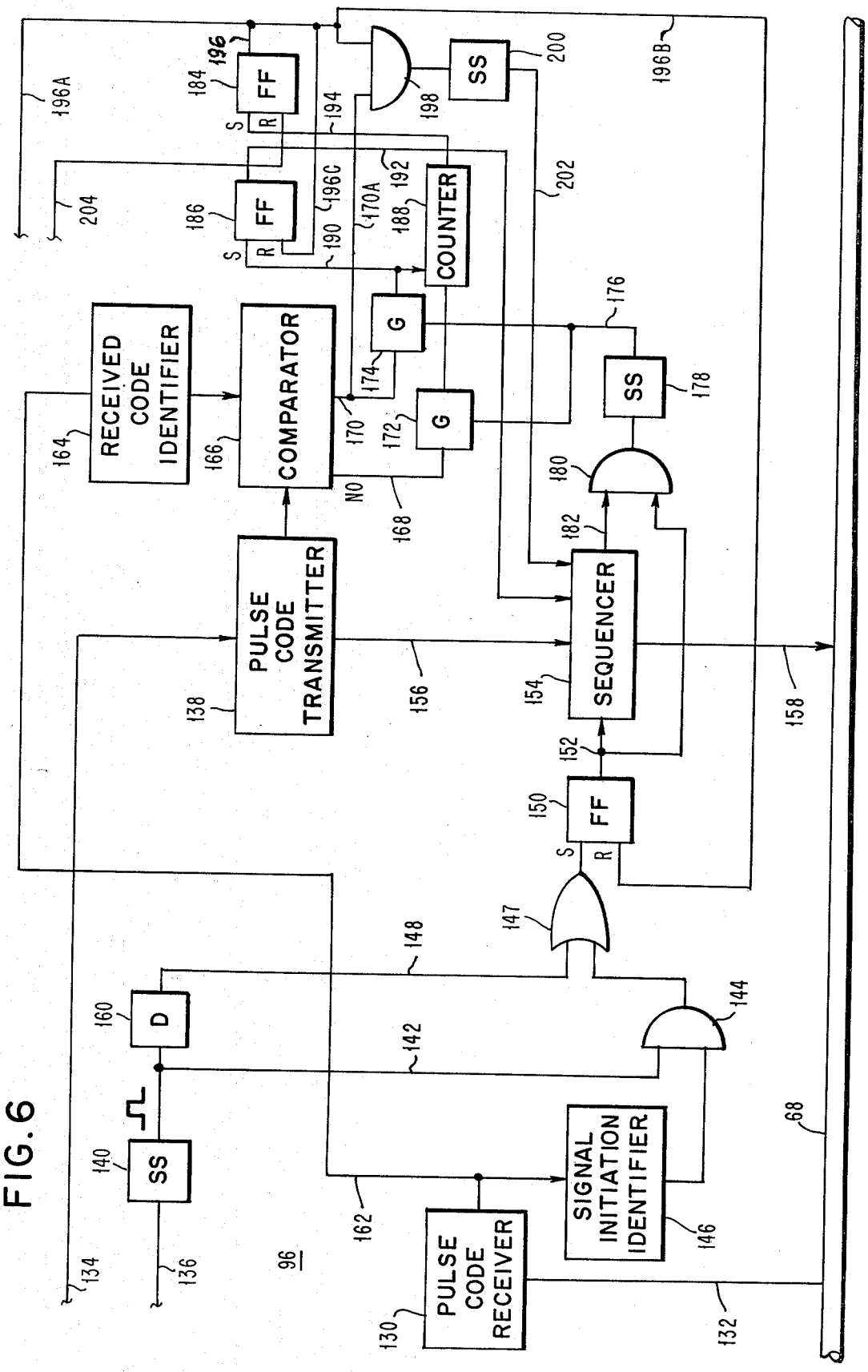
FIG. 6 is a schematic diagram illustrating a preferred embodiment of the intercommunication logic incorporated within each sequence controller for accomplishing the intercommunication between controllers.

Referring particularly to FIG. 6, whenever a request is to be transmitted by the intercommunication logic 96, signals are received from other circuits of the microcomputer on connections 134 and 136. The signals on connection 134 are carried to a pulse code transmitter 138 and serve to identify exactly which one of the ten pulse codes represented in FIG. 3 is to be transmitted. That pulse code is stored in pulse code transmitter 138 from the time the common function represented by that pulse code is requested, until the time that the common function is completed for the particular washer with which this particular controller is associated. The signal on connection 136 is a timing pulse which sets a single shot 140 which may be a monostable multivibrator circuit. The single shot circuit 140, in response to the input pulse, issues a square wave pulse of measured duration, which, through a connection 142 enables an AND gate 144. During that period of enablement of gate 144, the beginning or initiation of any pulse codes received from other controllers are detected.

Any pulse signals on bus 68 are received through a connection 132 by a pulse code receiver 130. During the period of enablement of gate 144, the beginning of any pulse signal received by receiver 130 is detected through connection 162 by a signal initiation identifier 146 which then supplies a pulse to the other input of AND gate 144. Thus, if any pulse codes are received during the pulse interval determined by single shot circuit 140, the initiation of such received pulse code will provide an output from AND gate 144 to an OR gate 147 resulting in a signal from gate 147 to the set input of a flip flop 150. When flip flop 150 is set, it provides an output at 152 to a sequencer circuit 154. That causes the sequencer circuit 154 to transmit the presently requested pulse code from pulse code transmitter 138 through a connection 158 to the intercommunication bus 68. The timing of the arrival of the signal at connection 152 at the sequencer 154 is related to the timing of the detection of the initiation of the received signal by the signal initiation identifier 146 so that the sequencer is caused to send the present pulse code request signal in an interlaced timing relationship with respect to the detected pulse code received by the receiver 130. In this way, the two pulse codes do not overlap, and thus confusion between the two codes is avoided.

If no other pulse code is detected during the pulse interval determined by the single shot circuit 140, after a predetermined delay interval as determined by a delay circuit 160, the delayed version of the pulse from from circuit 140 is supplied through the delay circuit 160 and connection 148 to the other input of OR gate 147, and thus to the set input of flip flop 150. Thus, flip flop 150 is set independent of outside signals from other controllers. In this instance, the circuit determines its own timing, since no interlacing is required. The sequencer operates in response to the microcomputer clock to issue a series of multiple pulse request signals which are spaced apart by predetermined time intervals.

In a time interval immediately after the transmission of each request signal (pulse code sequence) any response signals received by the pulse code receiver 130 are transmitted through a connection 162 to a received code identifier circuit 164, which is essentially a decoding circuit. Such received response signals are then compared in a comparator circuit 166 with the transmitted pulse code stored in circuit 138.

The comparator 166 provides a "no comparison" signal on connection 168 and a "yes comparison" signal on 170. The time window for recognizing whether or not comparison has taken place immediately after transmission of a request is provided by the two gate circuits 172 and 174. Those gate circuits are controlled through a common connection 176 from a single shot circuit 178 which is controlled by an AND gate 180. Gate 180 is enabled by a lower input connection from the output 152 of flip flop circuit 150 whenever that flip flop is set, indicating that a common function is being requested by the controller. The timing of the single shot pulse from circuit 178 is then determined by a pulse emitted on connection 182 by the sequencer 154 whenever the sequencer sends out a single request pulse code combination of pulses.

The "no comparison" or "yes comparison" signals gated through the gates 172 and 174 from comparator 166 are supplied to "no comparison" and "yes comparison" flip flops 184 and 186 respectively. The "no comparison" signals are supplied to the flip flop 184 through a counter 188, which is operable to transmit a signal on to the set input of flip flop 184 only after a series of "no comparison" signals have been received and counted by the counter. Any "yes comparison" signals are also received by the counter and cause the counter 188 to be reset through a connection 190. That same connection 190 is the output connection from gate 174 to the set input of the "yes comparison" flip flop 186. When the "yes comparison" flip flop 186 is set, an output is provided from that flip flop on a connection 192 back to the sequencer 154 which causes the sequencer to emit subsequent request signals at increased intervals.

When a "no comparison" condition has been detected in response to a series of requests, as counted in the counter 188, the counter 188 provides a set input on connection 194 to flip flop 184. The result is an output from flip flop 184 at connection 196. This is the signal which tells the controller that it can proceed with the common operation. The signal to the main logic of the controller to proceed with the common step is conveyed back to that main logic through the branch connection 196A. Through the branch of 196 identified as 196B, the signal is transmitted to reset flip flop 150 to disable the sequencer 154 and to prevent the transmission of further request signals. Also, through the 196C branch of connection 196, flip flop 186 is reset so that it is ready for future operation in response to new signals.

The signal on connection 196 also sets up request signal response logic consisting of the enablement of an AND gate 198 and a single shot circuit 200 connected at connection 202 back to the sequencer 154. The response logic then operates as follows: When a request signal is received from another controller, that signal is transmited through connection 132 from the intercommunication bus 68 to the pulse code receiver 130 and thus through connection 162 to the received code identifier 164. The received code is then compared in the comparison circuit 166 with the code of the operation presently being performed by the present controller as stored in pulse code transmitter 138. A "yes comparison" signal appears on connection 170 as a pulse which is supplied through the auxiliary connection 170A as the second input to AND gate 198, thus initiating the operation of single shot circuit 200 and causing a pulse to be transmitted through connection 202 to the sequencer 154. The sequencer then, in response to this pulse, issues a single response pulse sequence signal as required by the logic as previously described.

When the controller has completed the common operation, the main logic of the controller provides a signal to the reset input of flip flop 184 at connection 204, thus disabling the response logic including AND gate 198 and ending the operation. At the same time, the pulse code transmitter 138 is cleared by a signal from the main logic on connection 134.

It will be appreciated that the logic presented in FIG. 6 is basically schematic in nature and presented in relatively simplified form. Thus, additional logic gates and drivers may be required in order to avoid all risk of back circuits, and the like. Furthermore, equivalent logic circuits may be substituted for the logic circuits shown. For instance, NAND gates may be substituted for AND gates, and NOR gates may be substituted for OR gates. Still further, the functions of much of the logic illustrated in FIG. 6 may, if preferred, be accomplished by the general logic of the computer with appropriate programming software.

The system has been described above, particularly in connection with FIG. 1, on the basis of the use of only a single reservoir and a single pump capable of serving only one washer at a time for each chemical. However, in large laundry installations, it is often desirable to provide a number of chemical reservoirs and a number of pumps for some chemicals, particularly for the most commonly used detergent. It is also possible to use a plurality of pumps to deliver a commonly used chemical from a single large reservoir. A further variation has been in the use of a pump which is capable of providing the need of more than one washer at a time, and which is capable of providing a variable rate of flow, so that it can be used for supplying that chemical to, for instance, one, two, or three washers at a time. These possible variations in the chemical delivery systems in large laundries provide additional flexibility which is easily accommodated for by the system of the present invention. For instance, the washers and controls can be arranged in groups in which all of the members of each group are assigned to one set of chemical pumps and the intercommunication bus for each group is interconnected only to the members of that group. Then the members of the group exclude one another so that only one member of the group has possession of any one pump at any one time.

In some systems for large laundries, it may be advantageous to provide for more chemical delivery pumps for a very commonly used detergent, while only providing one delivery pump for other less frequently used chemicals. In such a situation, the controls of the present invention may be arranged to provide for mutually exclusive communication between the members of an individual group assigned to the use of a particular detergent pump with respect to detergent, while permitting communication and exclusive use by the members of the group together with members of other groups with respect to other chemicals. This is done by assigning an exclusive intercommunication channel code for detergent to the members of each group. Thus, code No. 1 of FIG. 3 could be assigned to the detergent for a first group of five washers, code No. 2 of FIG. 3 could be assigned to the detergent for a second group of five washers, and code No. 3 could be assigned to the detergent for a third group of five washers, each group of five washers being wired to activate its own detergent pump. All fifteen of the washers use the common code such as code No. 4 in FIG. 3 to call for a lesser used chemical such as bleach. Thus, all fifteen washers would operate on a mutually exclusive basis to use the bleach only one washer at a time, and yet the detergent selection would be only mutually exclusive within the members of the groups of five.

The same arrangement of grouping of washers can be employed when using a variable capacity chemical delivery pump which is capable of delivering a chemical such as detergent to up to three different washers at a time. Thus, the capacity of the detergent pump would never be exceeded even if one washer from each of the three groups demanded service at the same time.

For very large systems employing large pumps which can supply varying numbers of washers up to some maximum number, the control system can be modified to permit a number of washers to use a particular pump at the same time, a number corresponding to the maximum capacity of the pump, without the necessity for arranging the control and washer combinations into groups. This is done by providing an additional time window in the signal format of request pulses, and response pulses, the time window preferably occurring immediately after the response pulses. In this additional time window, each controller would have an exculsive pulse interval to identify that controller when it issued a response. The requesting controller would sum these identification pulses. If the pump capacity was limited to three washers, then the requesting controller would not switch on to perform that function if it had three unique response pulses which could be summed in a counter. However, if there were any less than three responses, the requesting controller would switch on. Thus, the system can be made to operate not only in an "ON"/"OFF" manner upon the receipt of any response, but it can also be made to operate in a quantitative manner when receiving a predetermined number of responses.

Preferred arrangements for chemical delivery systems for laundries are described above in which a separate pump is provided for each chemical. However, it will be understood that, while not preferred, the system of the present invention can be employed in an arrangement where one pump may serve to deliver more than one chemical, with the selection of the chemical to be delivered being carried out by means of individual valves on the individual chemical tanks.

The invention is presented above in terms of a separate sequence controller being provided for each washer. However, it will be understood that, if several washers are to be operated together on exactly the same sequence, and with chemical supply systems which are capable of supplying the complete needs of all of the washers which are being operated together at the same time, then a separate sequence controller can be effectively used for more than one washer at a time. Accordingly, within the terms used above, such a group of washers which are being operated together are considered to be a single washer within the context of the present invention.

While the invention is described exclusively in terms of laundry installations, it will be apparent that the invention is very effective for many different textile treatment processes, including dry cleaning, and various processes involved in textile manufacture such as dying, stripping, sizing, fireproofing, mildew proofing, and any other treatment of textiles with chemicals. Accordingly, as used in the present invention, the term "laundering" is intended to be defined in this broader sense of including dry cleaning and other textile treatments. However, the preferred application of the invention is to laundering (in water), and dry cleaning.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. A control and operating system for a laundry having a plurality of washers and having at least one function which is common to more than one of said washers and is to be performed by only one washer at a time,
comprising a separate sequence controller connected to each washer for controlling the sequential operations of that washer,
a common intercommunication channel means coupled to all of said controllers,
said controllers being operable to intercommunicate by request and response signals carried through said common channel and each of said controllers including control means enabling said washers to operate concurrently on the basis of those signals to prevent more than one washer at a time from performing a common function that is to be performed by only one washer at a time.

2. A system as claimed in claim 1 wherein
a common interconnection is provided from each of said controllers to each of the others of said controllers to establish said intercommunication channel.

3. A system is claimed in claim 2 wherein
each controller includes means operable when the control program calls for the performance of a common function that is to be performed by only one washer at a time to issue a request signal related to that function on said common interconnection,
each of said controllers including means operable while it is controlling its associated washer to perform a common function that is to be performed by only one washer at a time to respond to a request signal by another controller for that same function by sending out a response signal to the requesting controller telling the requesting controller to wait,
and each controller issuing a said request signal and receiving a said response signal being operable to wait and to periodically issue new request signals until a said response signal is not received.

4. A system as claimed in claim 3 wherein
provision is made for a plurality of common functions each to be performed by only one washer at a time and wherein
each of said controllers includes means operable to issue a distinctive request signal for each separate common function that is to be performed exclusively by only one washer at a time, and
each controller includes means operable when the associated washer is performing a particular function to be performed exclusively by only one washer at a time to respond to the distinctive request signals for that particular common function by sending a distinctive response signal for that function back to the requesting controller.

5. A system as claimed in claim 4 wherein
the last recited means of each of said controllers is operable to recognize the receipt of a said distinctive response signal only during a limited time interval after transmission by that controller of the distinctive request signal corresponding to that particular distinctive response signal.

6. A system as claimed in claim 5 wherein
said request signal means is operable to send out said request signals on said common interconnection as pulse coded signals.

7. A system as claimed in claim 6 wherein
said request signal means is operable to serially transmit said pulse coded signals on said common interconnection.

8. A system as claimed in claim 7 wherein
said response signal means of each of said controllers is operable to transmit said response signals in the form of a serially transmitted pulse code.

9. A system as claimed in claim 8 wherein
each controller is operable to scan for signals from other controllers for at least one request and response interval before issuing a request signal, and wherein each controller is operable upon the detection of a signal from any other controller to actuate said request signal means to issue request signals which are time synchronized with the signal from the other controller so as to be interlaced with the other controller signals to thereby avoid ambiguous signalling.

10. A system as claimed in claim 8 wherein
said request signal means of each controller is operable to issue a plurality of pulse coded request signals in connection with any one request in order to improve the accuracy of the exclusive function control.

11. A system as claimed in claim 10 wherein
each of said controllers includes means operable to issue a response signal in response to every request signal for performance of a common function that is being performed by the washer associated with that controller so that a plurality of request signals results in a plurality of corresponding response signals if a washer is performing the requested common function.

12. A system as claimed in claim 11 wherein
each controller is operable to proceed with a requested common function only after sending a plurality of request signals to which no distinctive response signals are received.

13. A system as claimed in claim 8 wherein
said request and response signalling means are operable to issue said request and response signals in the form of a first pulse to signify the beginning of the pulse coded signal followed by a plurality of timed intervals selectively containing pulses and an absence of pulses to provide distinctive pulse codes.

14. A system as claimed in claim 13 wherein
said request and response signalling means are operable to issue the pulse coded signals in the form of bursts of carrier frequency transmitted during the timed pulse intervals.

15. A system as claimed in claim 4 wherein
at least one of said common functions consists in the addition of a chemical,
the system including a delivery pump for that chemical and a reservoir for that chemical and a piping system for carrying that chemical from said pump through individual washer control valves to the individual washers,
the controller for each washer including means operable when the controller is performing the common function of adding the chemical to energize said pump and to open the supply valve for the washer controlled by that controller.

16. A system as claimed in claim 15 wherein
each of said controllers includes a manually operable switching means which is effective to disable the automatic addition of the chemical,
said controller including means operable in response to such disablement to interrupt the program and to flash an indicator uniquely identifying the chemical which is to be added,
the controller including an advance switch and circuitry associated with that advance switch to cause the controller to continue the program upon subsequent closure of said advance switch by the operator after the operator has manually added the chemical.

17. A system as claimed in claim 4 wherein
at least one of said common functions consists of a high-speed spin cycle for extraction.

18. A system as claimed in claim 4 wherein
each of said sequence controllers includes an internal counter which is operable to count the total number of times that the program cycle is performed for record purposes.

19. A system as claimed in claim 18 wherein
each sequence controller is programmable to perform a plurality of different washer programs and wherein each controller includes a plurality of program cycle counters operable to separately count and accumulate the number of programmed cycles performed by the associated washer for each of said different programs.

20. A control and operating system for a laundry having a plurality of washers and having a plurality of functions which are common to more than one of said washers and in which individual common functions are to be performed by only one washer at a time, comprising a separate sequence controller connected to each washer for controlling the sequential operations of that washer,
each said controller comprising a microcomputer,
a common intercommunication channel means coupled to all of said controllers,
said controllers being operable to intercommunicate by request and response signals carried through said common channel means,
each controller including means operable when the control program calls for the performance of any one of a plurality of common functions which is to be performed by only one washer at a time to issue a distinctive request signal for each separate common function that is to be performed exclusively by only one washer at a time,
each controller including means operable when the associated washer is performing a particular function to be performed exclusively by only one washer at a time to respond to the distinctive request signals for that particular common function by sending out a distinctive response signal for that function back to a requesting controller telling the requesting controller to wait to perform that particular function,
and each controller issuing a said request signal and receiving a said response signal being operable to wait and to periodically issue new request signals until a said response signal is not received.

* * * * *